(12) United States Patent
Nakata et al.

(10) Patent No.: US 10,753,437 B2
(45) Date of Patent: Aug. 25, 2020

(54) CHAIN GUIDE

(71) Applicant: TSUBAKIMOTO CHAIN CO., Osaka-shi, Osaka (JP)

(72) Inventors: Yohei Nakata, Osaka (JP); Toshitaka Ogo, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 363 days.

(21) Appl. No.: 15/889,618

(22) Filed: Feb. 6, 2018

(65) Prior Publication Data

US 2018/0245673 A1 Aug. 30, 2018

(30) Foreign Application Priority Data

Feb. 24, 2017 (JP) .................................. 2017-33208

(51) Int. Cl.
  *F16H 7/18* (2006.01)
  *F16H 7/08* (2006.01)

(52) U.S. Cl.
  CPC .................. *F16H 7/18* (2013.01); *F16H 7/08* (2013.01); *F16H 2007/0872* (2013.01); *F16H 2007/0893* (2013.01); *F16H 2007/185* (2013.01)

(58) Field of Classification Search
  CPC ........ F16H 7/08; F16H 7/18; F16H 2007/185; F16H 2007/0872; F16H 2007/0893
  USPC .................................................. 474/111, 140
  See application file for complete search history.

(56) References Cited

U.S. PATENT DOCUMENTS

| 4,832,664 | A  | * | 5/1989 | Groger ...................... F01L 1/02 |
| | | | | 474/111 |
| 6,013,000 | A  | * | 1/2000 | Moretz ..................... F16H 7/08 |
| | | | | 474/111 |
| 2002/0004433 | A1 | * | 1/2002 | Fujiwara ............. B29C 45/1639 |
| | | | | 474/111 |
| 2003/0050140 | A1 | * | 3/2003 | Konno ...................... F16H 7/18 |
| | | | | 474/111 |
| 2008/0153643 | A1 | * | 6/2008 | Franke ...................... F16H 7/18 |
| | | | | 474/111 |
| 2008/0194365 | A1 | | 8/2008 | Aken Van et al. |
| 2014/0274514 | A1 | * | 9/2014 | Mori ......................... F16H 7/18 |
| | | | | 474/140 |
| 2015/0260263 | A1 | * | 9/2015 | Chottiner .............. C23C 28/323 |
| | | | | 474/111 |

(Continued)

FOREIGN PATENT DOCUMENTS

JP 2009-501887 A 1/2009

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

A chain guide is provided which has a simple structure and improved durability, and which enables reduction in weight and in material cost, and moreover which does not inhibit smooth flow of resin inside a metal mold, and with which dimension errors, contour errors, internal distortion, defects and the like are reduced and concentration of internal stresses or repeatedly applied bending stresses can be prevented. A reinforcing rib of a body part includes a lateral rib that has an independent zone not connected to other parts of the reinforcing rib over a length of 20% or more of a distance between support portions at two locations of the rib. The independent zone is provided on a side further away from a guide surface than a midpoint of the height of the support wall.

6 Claims, 11 Drawing Sheets

(56) References Cited

U.S. PATENT DOCUMENTS

2018/0195584 A1* 7/2018 Park .................... F16H 7/08

* cited by examiner

CHAIN GUIDE

BACKGROUND OF THE INVENTION

1. Field of the Invention

The present invention relates to a chain guide that has a guide surface for slidably guiding a running chain and a body part that supports the guide surface along the chain running direction, the body part having a reinforcing rib.

2. Description of the Related Art

It has been common practice to use a chain guide, which has a guide surface for slidably guiding a running chain and a body part that supports the guide surface along the chain running direction, to stabilize the chain running between sprockets and to keep appropriate chain tension.

An engine timing system, for example such as the one shown in FIG. 10 is known, in which an endless transmission chain CH such as a roller chain or the like is passed over sprockets S1 and S2 respectively provided to a crankshaft and cam shafts inside an engine room E. The endless timing chain CH passing over a drive sprocket S1 of the crankshaft and a pair of driven sprockets S2 of the cam shafts inside the engine room E is guided by a pivoting chain guide (pivot guide) 500 and a chain guide (fixed guide) 600.

In this known timing system, the fixed guide 600 is fixed with two mounting shafts Q inside the engine room E, while the pivot guide 500 is attached such as to be pivotable around a pivot shaft P in the plane in which the timing chain CH runs inside the engine room E.

The chain tensioner T presses the pivot guide 500 and thereby maintains the tension of the timing chain CH at an appropriate level as well as reduces its vibration.

The known chain guide (pivot guide) 500 used in such a timing system has a guide shoe 510 with a guide surface 511 and a body part 520 as shown in FIG. 10 and FIG. 11. The body part 520 includes a support wall 521 extending toward an opposite side from the guide surface 511, and, as two support parts, a mounting boss 523 and a pressed part 524 that is pressed by the tensioner T toward the chain.

The body part 520 further includes reinforcing ribs 522 extending in a height direction at suitable spacing in suitable shapes and directions, to enhance the rigidity of the body part 520.

The chain guide (fixed guide) 600 is provided with two mounting bosses 623 to be fixed to the two mounting shafts Q as the two support parts instead of the mounting boss 523 and pressed part 524 of the previously described chain guide (pivot guide) 500.

Chain guides 500 and 600 having the guide shoe 510 and body part 520 integrally formed by injection molding or the like are also known.

SUMMARY OF THE INVENTION

Such a known chain guide is subject to limitations on installation space when mounted inside an engine room E such as the example shown in FIG. 10, and therefore it is required to secure rigidity and durability with a smaller size.

To achieve this, it is necessary to increase the thickness of the support wall of the body part or of reinforcing ribs, or to increase the number of reinforcing ribs. The problem was that these measures made it difficult to achieve weight reduction, and led to increased material costs.

The force applied from the chain on the guide surface causes internal stresses, which inevitably concentrate on lower end portions of reinforcing ribs that extend in the height direction. Even if the strength and rigidity of the overall chain guide are enhanced, there still is the problem of breakage possibilities caused by local concentration of stresses.

Moreover, reinforcing ribs can become an obstacle to smooth flow of resin inside a metal mold when forming the body part by injection molding. An increase in the thickness or number of the reinforcing ribs may make the resin orientation uneven, which may lead to dimensional errors, contour errors, internal distortion, defects and the like.

To alleviate these problems, one known chain guide has reinforcing ribs that provide reinforcement only along the directions in which forces act most, the ribs extending from near a midpoint in the longitudinal direction of the body part, which is the center of pressure applied from the chain, with a large inclination toward support portions at two locations that receive the pressure (see Japanese Translation of PCT Application No. 2009-501887).

The body part is subject to bending forces since it receives the pressure from the chain at two support portions. With the reinforcing ribs of Japanese Translation of PCT Application No. 2009-501887, the bending stresses concentrate on the midpoint in the longitudinal direction, and deformation occurs intensively and repeatedly around the midpoint in the longitudinal direction due to these stresses, because of which improvement of durability was limited.

Another problem was that the portion near the midpoint in the longitudinal direction distanced from the reinforcing ribs has lower rigidity against torsion.

The present invention solves these problems, its object being to provide a chain guide which has a simple structure but improved durability, which enables reduction in weight and in material cost, and which does not inhibit smooth flow of resin inside a metal mold so that dimension errors, contour errors, internal distortion, defects and the like are reduced and concentration of internal stresses or repeatedly applied bending stresses can be prevented.

The invention according to claim 1 solves the problems above by providing a chain guide including a guide surface that slidably guides a running chain and a body part that supports the guide surface along a chain running direction. The body part includes a support wall of a predetermined height and a reinforcing rib protruding laterally from a portion other than upper and lower edges of the support wall. The reinforcing rib includes a lateral rib. The body part includes support portions at at least two locations respectively, which are spaced away from each other in a longitudinal direction. The lateral rib has an independent zone where the lateral rib is not connected to other parts of the reinforcing rib over a length of 20% or more of a distance L between the support portions at the two locations. The independent zone is provided on a side further away from the guide surface than a midpoint of the height of the support wall.

In the chain guide according to claim 1, the reinforcing rib includes a lateral rib, whereby the body part is reinforced and the durability is improved, as well as the bending rigidity against flexure or torsion is enhanced.

The body part includes support portions at at least two locations respectively, which are spaced away from each other in a longitudinal direction. The lateral rib has an independent zone where the lateral rib is not connected to other parts of the reinforcing rib over a length of 20% or more of a distance L between the support portions at the two locations. This ensures that internal stress does not concentrate on a specific location on the lower edge of the body part as the guide surface receives force from the chain, so that breakage caused by local concentration of internal stresses can be prevented.

The independent zone is provided on a side further away from the guide surface than a midpoint of the height of the support wall. This way, the part subject to tensile stresses when bending forces concentrate near the midpoint in the longitudinal direction of the body part can be reinforced, so that repeated deformation is reduced and durability can be improved. Also, the rigidity against torsion of the part near the midpoint in the longitudinal direction can be enhanced.

Vertical reinforcing ribs can be decreased, or eliminated, so that there are fewer parts that will disturb the flow of resin inside a metal mold during production. As the resin orientation is made uniform, possible dimensional errors, contour errors, internal distortion, defects and the like can be reduced. Also, the bending rigidity against flexure, torsion and the like can be enforced.

According to the configuration as set forth in claim 2, the reinforcing rib is formed only of the lateral rib. An overall weight reduction is achieved, and the resin flow inside a metal mold during production is made more even.

According to the configuration as set forth in claim 3, the body part includes a laterally protruding outer edge rib along upper and lower edges of the support wall. The reinforcing rib includes a connecting rib that extends from the lateral rib to the outer edge rib. The connecting rib can further increase the rigidity of parts that need reinforcement, and enable the resin to flow more evenly in the outer edge rib and lateral rib portions of the metal mold during production.

According to the configuration as set forth in claim 4, at least one of the support portions at the two locations is formed by a mounting boss protruding laterally from the support wall, and the lateral rib is connected to the mounting boss. The resin flow is made uniform in the mounting boss and lateral rib portions of the metal mold during production.

According to the configuration as set forth in claim 5, the reinforcing rib is composed only of the independent zone of the lateral rib. Size and weight reductions can be achieved while necessary rigidity and durability are ensured, so that a reduction in material costs is made possible.

According to the configuration as set forth in claim 6, the independent zone is provided over a length of 50% or more of the distance L between the support portions at the two locations. The overall rigidity is further increased, while stress concentration to the lower edge of the body part is mitigated, and repeated deformation can be reduced.

DESCRIPTION OF THE PREFERRED EMBODIMENTS

The present invention can be embodied in any specific configuration as long as it is a chain guide including a guide surface that slidably guides a running chain and a body part that supports the guide surface along a chain running direction, the body part including a support wall of a predetermined height, and a reinforcing rib protruding laterally from a portion other than upper and lower edges of the support wall, the reinforcing rib including a lateral rib, the body part including support portions at at least two locations respectively, which are spaced away from each other in a longitudinal direction, the lateral rib having an independent zone where the lateral rib is not connected to other parts of the reinforcing rib over a length of 20% or more of a distance L between the support portions at the two locations, the independent zone being provided on a side further away from the guide surface than a midpoint of the height of the support wall, whereby the chain guide has a simple structure but improved durability, enables reduction in weight and in material cost, and does not inhibit smooth flow of resin inside a metal mold so that dimension errors, contour errors, internal distortion, defects and the like are reduced and concentration of internal stresses or repeatedly applied bending stresses can be prevented.

The body part and the guide surface may be separate components, or formed integrally. Known suitable materials may each be selected in accordance with the rigidity, sliding characteristics, moldability, cost, and so on.

First Embodiment

Figure 1:
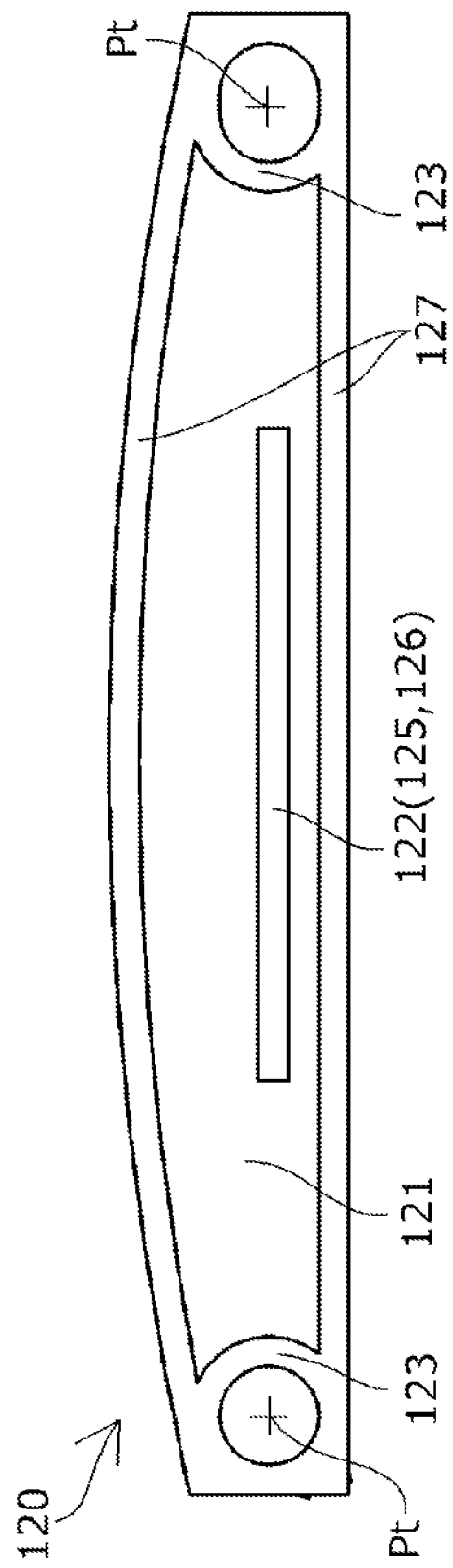
FIG. 1 is a side view of a chain guide (fixed guide) according to a first embodiment of the present invention.
Figure 2:
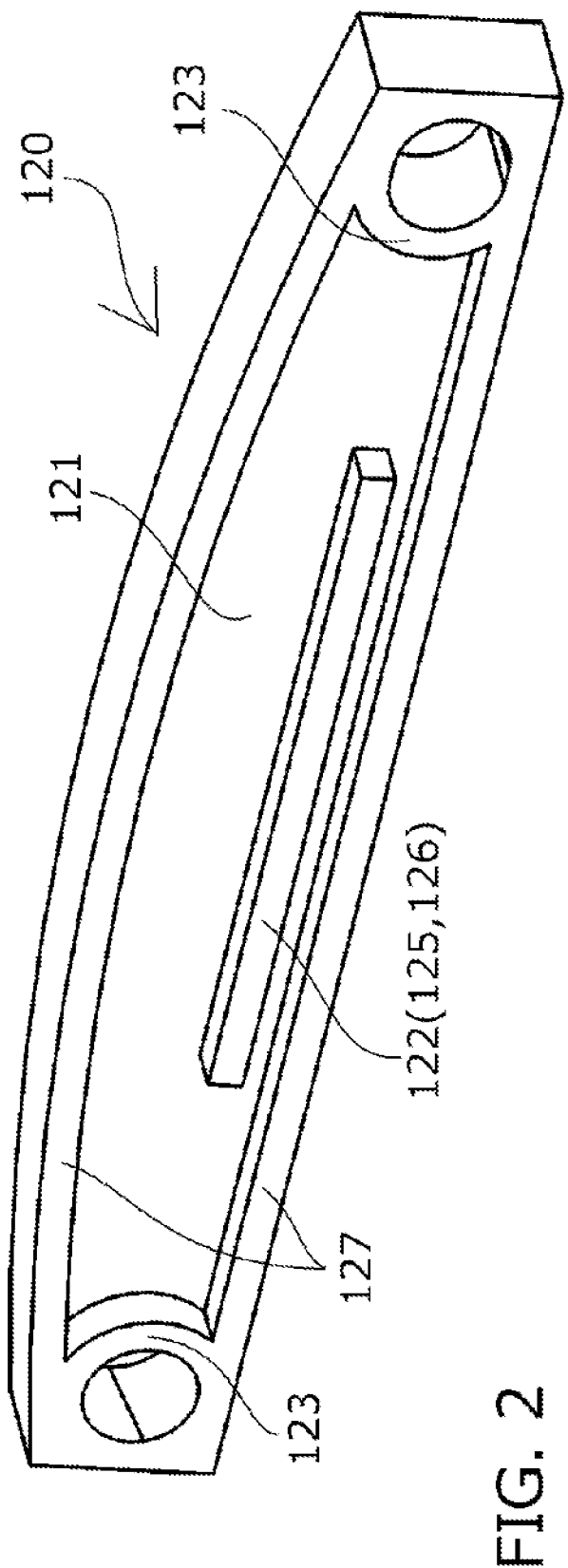
FIG. 2 is an illustrative perspective view of FIG. 1.

A chain guide (fixed guide) according to a first embodiment of the present invention is fixed inside an engine that has a timing system for guiding and stabilizing a running timing chain CH. As shown in FIG. 1 and FIG. 2, the chain guide includes a body part 120 that integrally has a guide surface (not shown) at the top.

The body part 120 includes mounting bosses 123 at two locations, at both ends in the longitudinal direction of a support wall 121 as mounting portions for the guide to be mounted to an engine or the like, similarly to the known chain guide (pivot guide) 500 described in the foregoing. The upper and lower edges of the support wall 121 extend to connect the mounting bosses 123 at two locations. A outer edge rib 127 is provided on one outer side of the support wall 121 to increase the rigidity and durability of the body part 120.

The guide surface (not shown) may be fixedly attached to the top of the body part 120, or, the upper face of the body part 120 may be formed as a sliding guide surface to integrate the function of the guide surface.

In this embodiment, the reinforcing rib 122 is composed only of a lateral rib 125 extending along the direction of a line connecting support portions Pt (centers of the mounting bosses 123) at two locations distanced from each other in the longitudinal direction. The rib is formed only of an independent zone 126 that is not connected to other portions.

Figure 3:
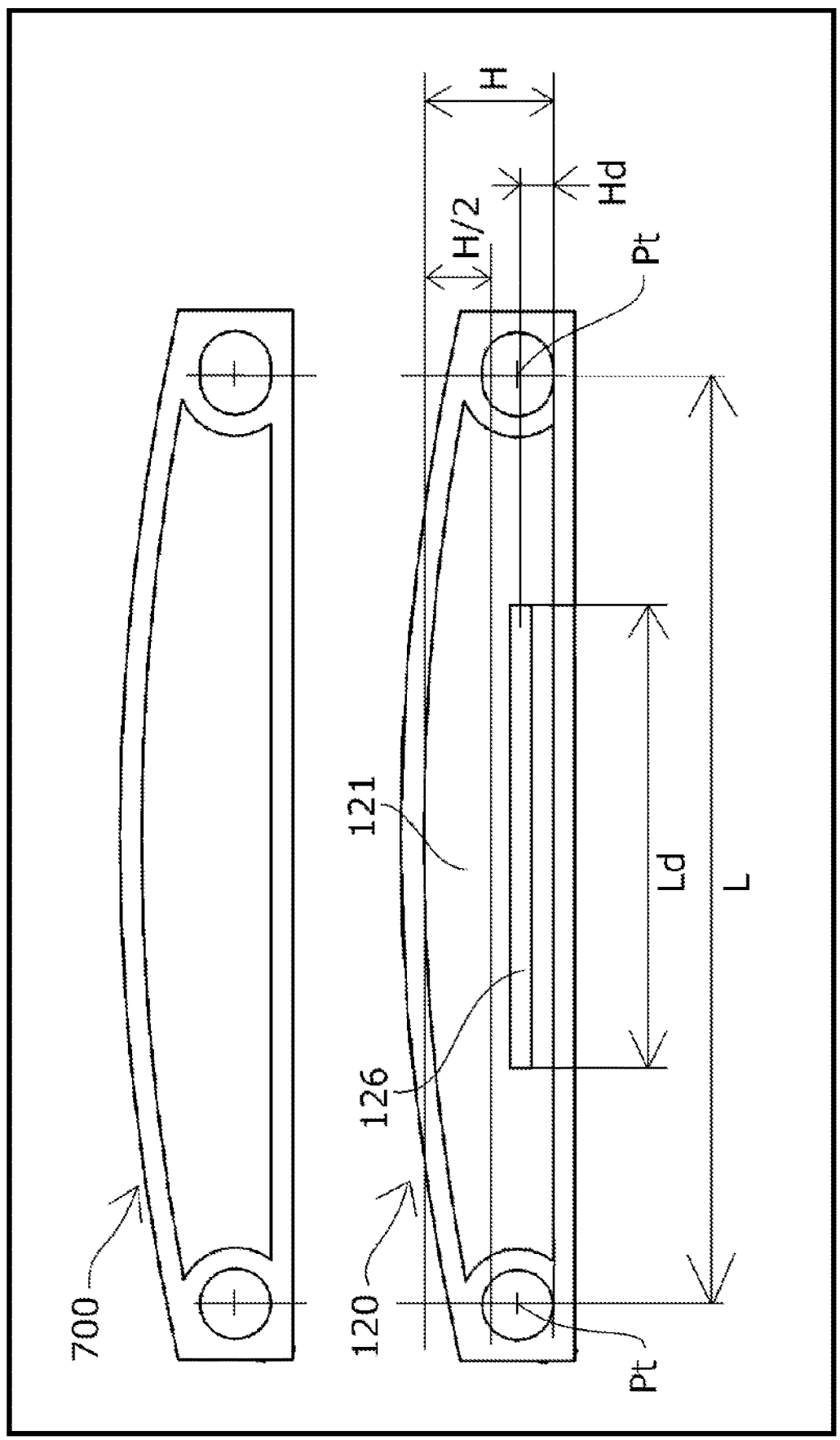
FIG. 3 is a diagram for explaining dimensions of the present invention and a conventional example.

As shown in FIG. 3, the length Ld of the independent zone 126 is 20% or more of the distance L between the two support portions Pt. The independent zone 126 is located on a side further away from the guide surface than the midpoint (H/2) of the height H of the support wall 121.

This ensures that internal stress does not concentrate on a specific location on the lower edge of the body part 120 as guide surface receives force from the chain, so that breakage caused by local internal stress concentration can be prevented.

The bending stress on the body part 120 causes a compressive stress on the upper half (guide surface side) above the midpoint (H/2) of the height H of the support wall 121, and a tensile force on the lower half (the side farther from the guide surface) below the midpoint (H/2). Repeated application of stresses makes the lower half (below the midpoint H/2), which is subject to tensile stresses, particularly prone to break.

According to the present invention, the independent zone 126 is provided on a side further away from the guide surface than the midpoint (H/2) of the height H of the support wall 121, so that not only the body part is reinforced but also tensile stress is dispersed and less concentrated to and around the center and thus breakage can be prevented.

Figure 4:
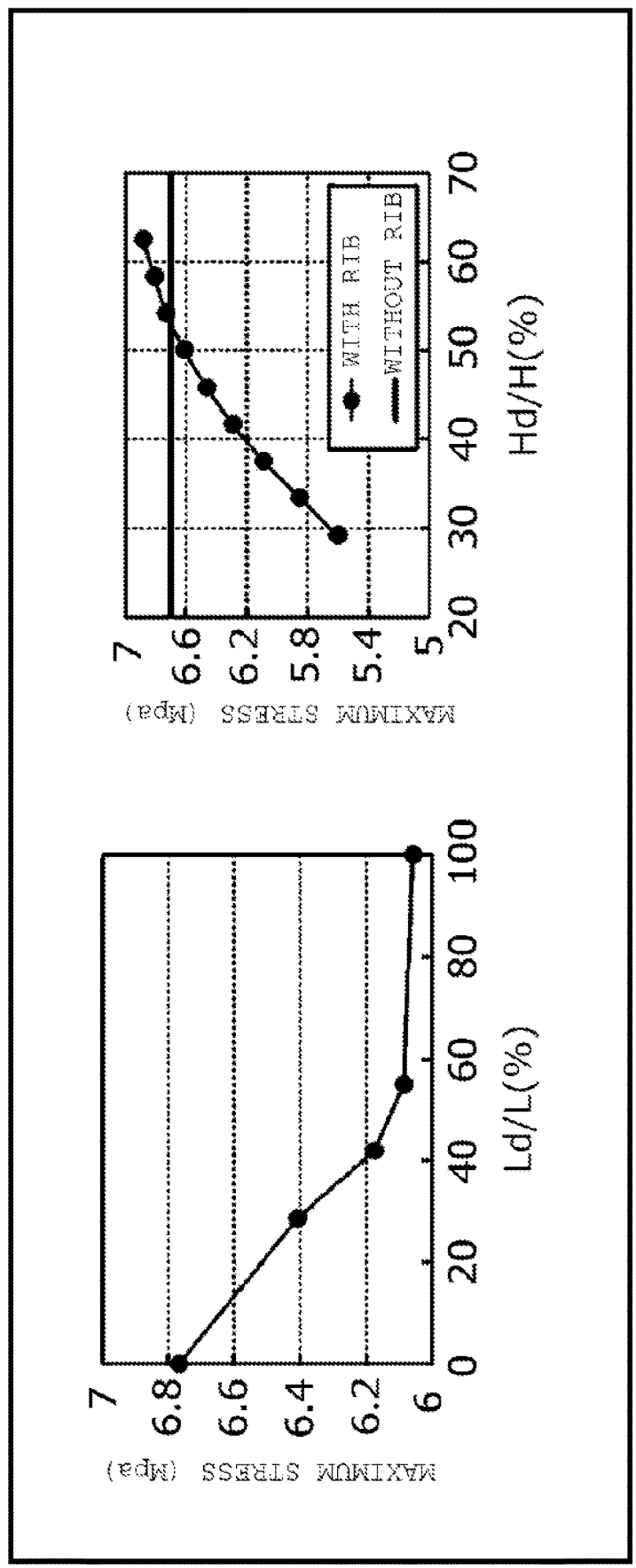
FIG. 4 shows graphs of maximum internal stress of the present invention and a conventional example.

FIG. 4 shows the results of analysis of how maximum stress at an outer edge rib at the bottom changes when the length Ld and height Hd of the independent zone 126 of the body part 120 are varied, in the chain guide according to the first embodiment shown on the lower side of FIG. 3.

Ld/L=0 in the graph on the left side of FIG. 4, and the graph on the right side denoted as "without rib" represent the results of analysis of a conventional chain guide example 700 shown on the upper side of FIG. 3 (same as the body part 120 of the chain guide according to the first embodiment, but without the reinforcing rib 122).

As can be seen from the results of Ld/L on the left side of FIG. 4, sufficient stress mitigation effect can be achieved if Ld/L≥20%. The stress mitigation effect increases substantially linearly until Ld/L reaches more or less 50%, and therefore, preferably, Ld/L≥50%.

As can be seen from the results of Hd/H on the right side of FIG. 4, in the chain guide according to the first embodiment, the compressive stress component is augmented when the rib height ratio Hd/H exceeds 50%, resulting in a larger maximum stress at an outer edge rib at the bottom.

Therefore, it is preferable to provide the independent zone on a side further away from the guide surface than the midpoint (H/2) of the height H of the support wall (Hd/H≤50%).

Second Embodiment

Figure 5:
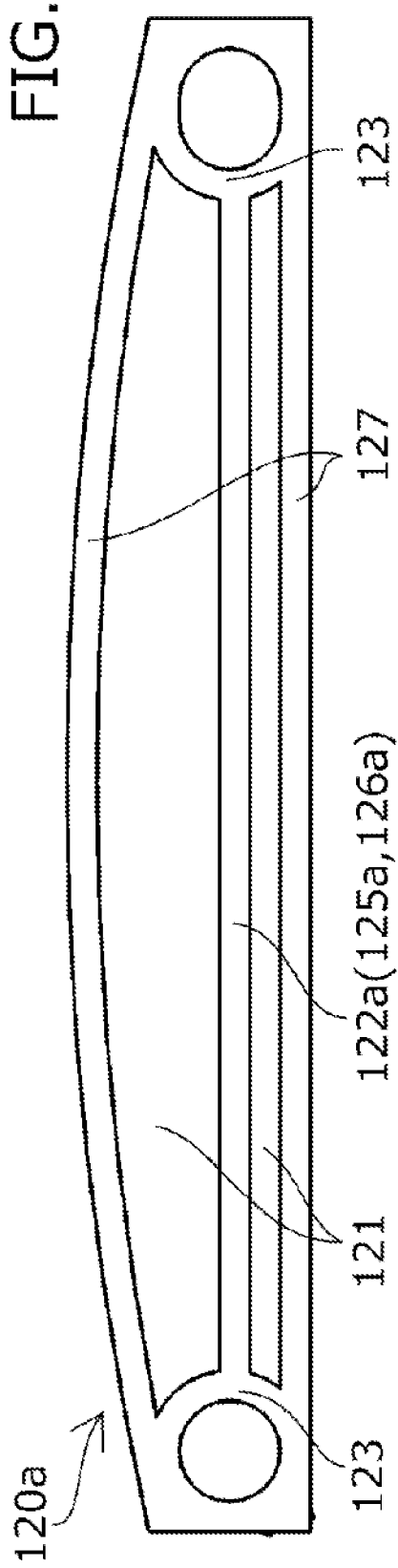
FIG. 5 is a side view of the chain guide (fixed guide) according to a second embodiment of the present invention.

In the chain guide (fixed guide) according to a second embodiment of the present invention, as shown in FIG. 5, the reinforcing rib 122a of the body part 120a is composed only of a lateral rib 125a extending along the direction of a line connecting support portions Pt (centers of the mounting bosses 123) at two locations distanced from each other in the longitudinal direction. Both ends of the rib are connected to the mounting bosses 123 and the rib is entirely formed of an independent zone 126a that is not connected to other portions.

Ld/L is therefore nearly 100% and the stress mitigating effect can be achieved maximally.

Third Embodiment

Figure 6:
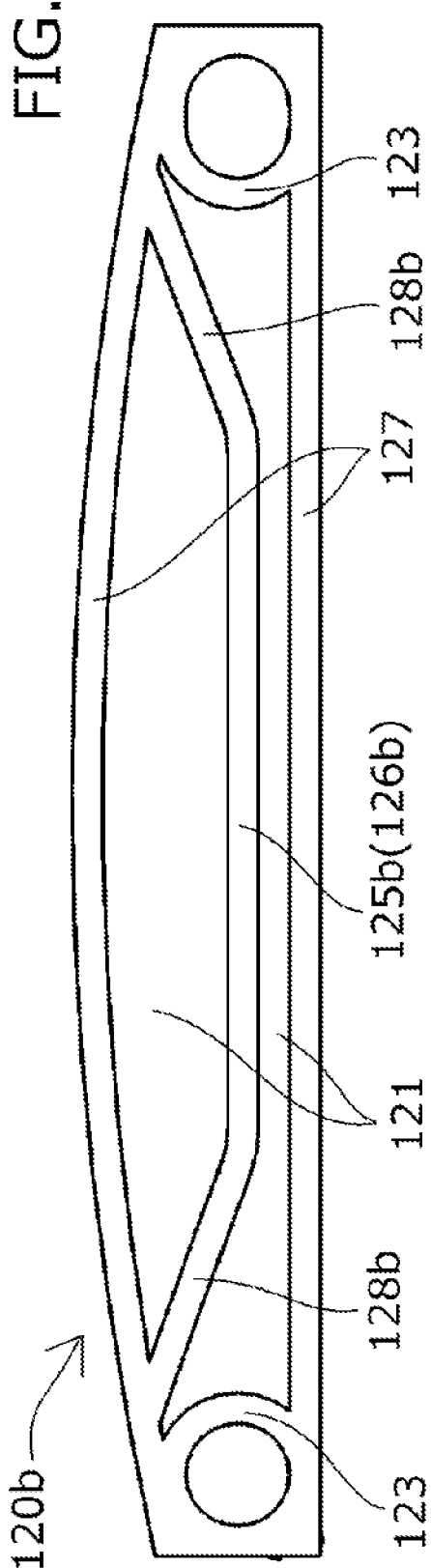
FIG. 6 is a side view of the chain guide (fixed guide) according to a third embodiment of the present invention.

In the chain guide (fixed guide) according to a third embodiment of the present invention, as shown in FIG. 6, the reinforcing rib of the body part 120b is composed of a lateral rib 125b extending along the direction of a line connecting support portions Pt (centers of the mounting bosses 123) at two locations distanced from each other in the longitudinal direction, and two connecting ribs 128b extending from both ends of the lateral rib toward the outer edge rib 127 above.

The two connecting ribs 128b are each connected to the outer edge rib 127 near each mounting boss 123.

This design enables smooth flow of resin inside the metal mold while securing a necessary length of the independent zone 126b, whereby dimensional errors, contour errors, internal distortion, defects and the like can be reduced.

Fourth Embodiment

Figure 7:
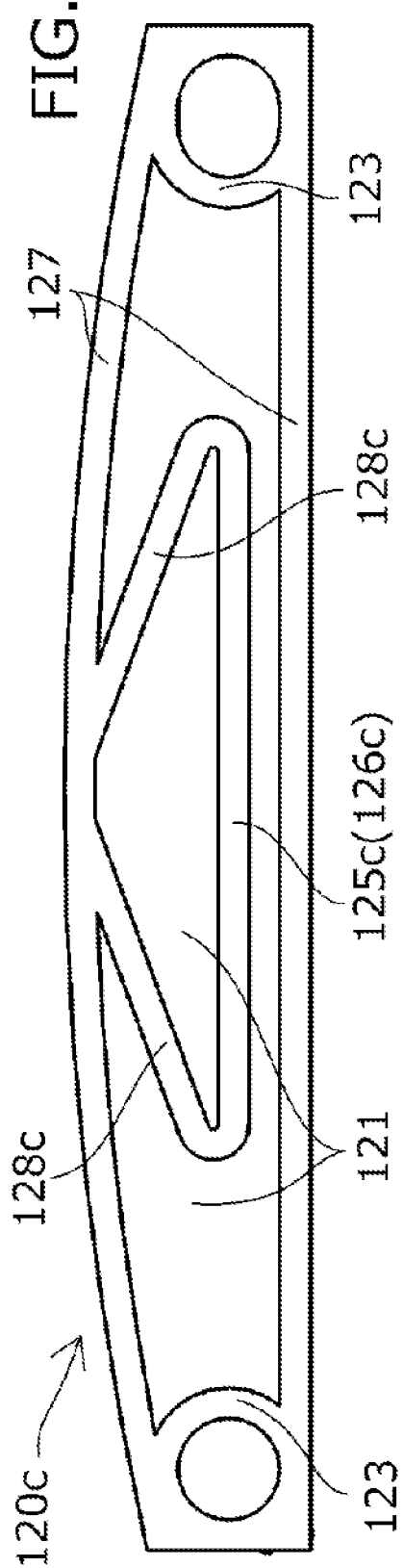
FIG. 7 is a side view of the chain guide (fixed guide) according to a fourth embodiment of the present invention.

In the chain guide (fixed guide) according to a fourth embodiment of the present invention, as shown in FIG. 7, the reinforcing rib of the body part 120c is composed of a lateral rib 125c extending along the direction of a line connecting support portions Pt (centers of the mounting bosses 123) at two locations distanced from each other in the longitudinal direction, and two connecting ribs 128c extending from both ends of the lateral rib toward the outer edge rib 127 above.

The two connecting ribs 128c are each connected to the outer edge rib 127 near the center in the longitudinal direction.

The stress applied to and around the center of the outer edge rib 127 where the pressing force from the chain is largest is transmitted via the connecting ribs 128c to the lateral rib 125c. Thus reinforcement in the vertical direction can also be provided with a small length of the ribs.

Fifth Embodiment

Figure 8:
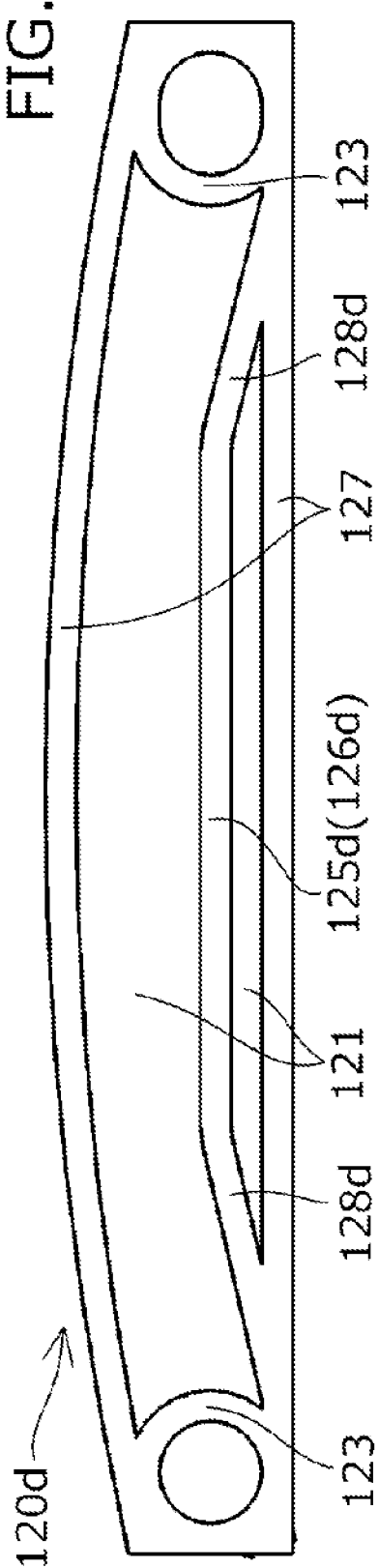
FIG. 8 is a side view of the chain guide (fixed guide) according to a fifth embodiment of the present invention.

In the chain guide (fixed guide) according to a fifth embodiment of the present invention, as shown in FIG. 8, the reinforcing rib of the body part 120d is composed of a lateral rib 125d extending along the direction of a line connecting support portions Pt (centers of the mounting bosses 123) at two locations distanced from each other in the longitudinal direction, and two connecting ribs 128d extending from both ends of the lateral rib toward the outer edge rib 127 below.

The two connecting ribs 128d are each connected to the outer edge rib 127 near each mounting boss 123.

This design enables smooth flow of resin inside the metal mold while securing a necessary length of the independent zone 126d, whereby dimensional errors, contour errors, internal distortion, defects and the like can be reduced.

Sixth Embodiment

Figure 9:
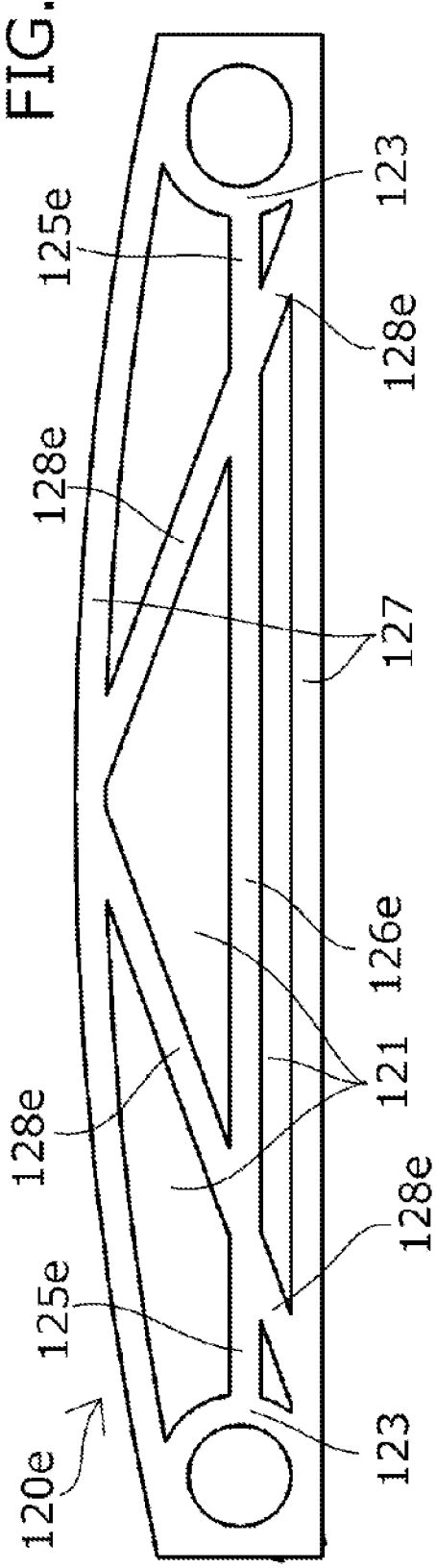
FIG. 9 is a side view of the chain guide (fixed guide) according to a sixth embodiment of the present invention.
Figure 10:
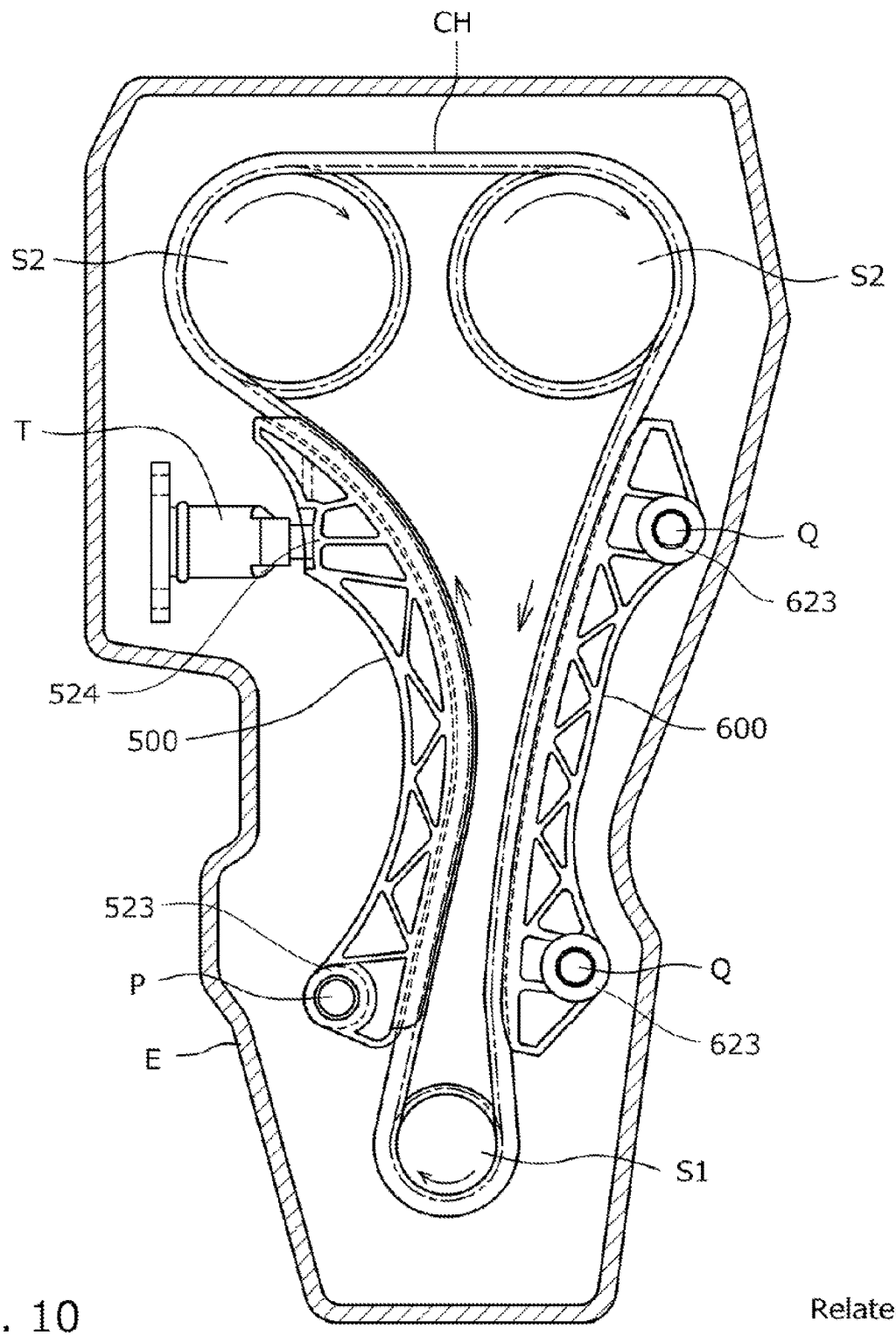
FIG. 10 is an illustrative view of a conventional engine timing system.
Figure 11:
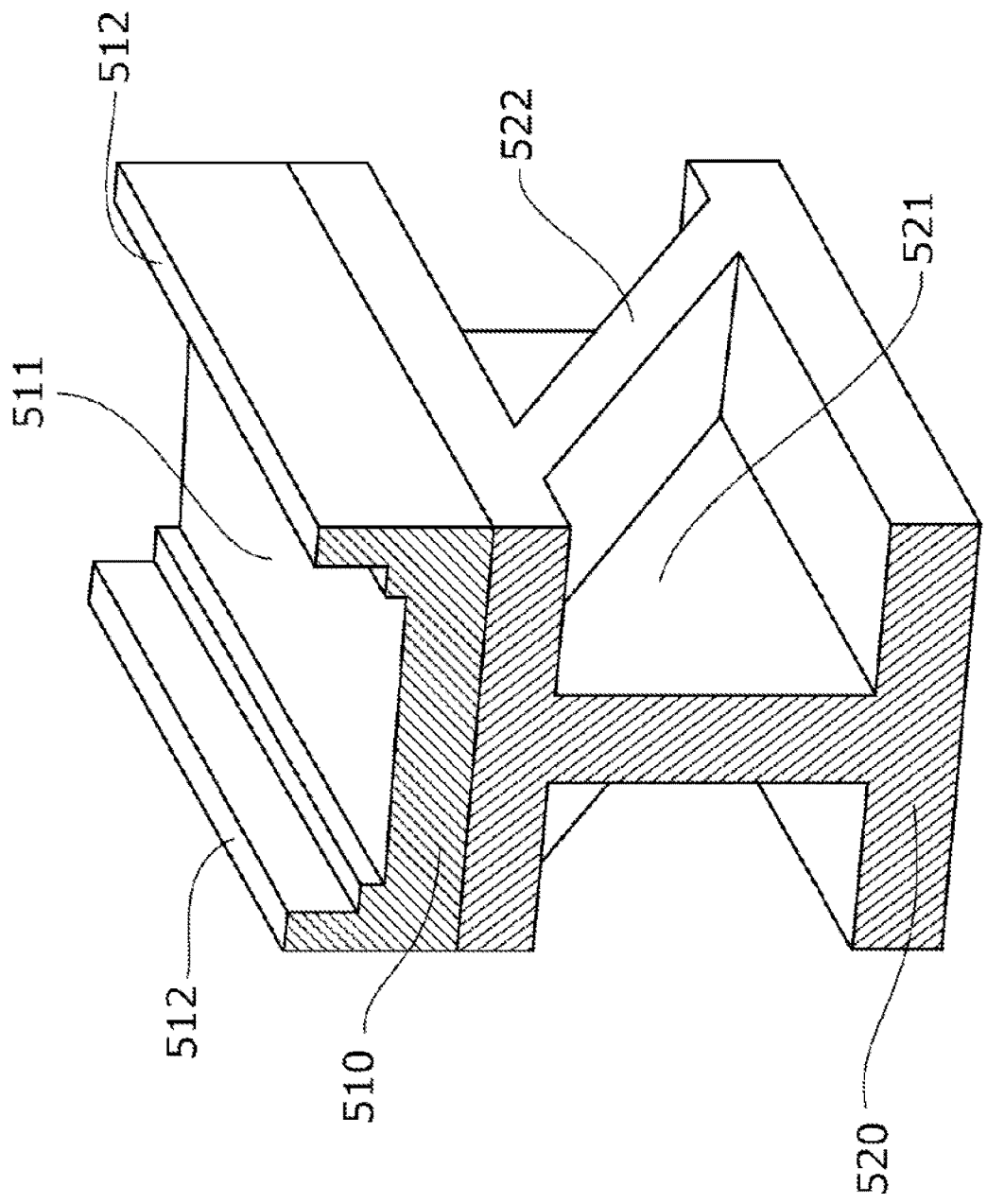
FIG. 11 is a schematic cross-sectional perspective view of a conventional chain guide.

In the chain guide (fixed guide) according to a sixth embodiment of the present invention, as shown in FIG. 9, the reinforcing rib of the body part 120e is composed of a lateral rib 125e extending along the direction of a line connecting support portions Pt (centers of the mounting bosses 123) at two locations distanced from each other in the longitudinal direction and connected at both ends to the mounting bosses 123, and two connecting ribs 128e extending from near the center of the upper outer edge rib 127 toward portions of the lower outer edge rib 127 near the mounting bosses 123.

The lateral rib 125e and the two connecting ribs 128e are connected to each other at their intersections, and the independent zone 126e is defined between the two intersections.

This design enables smooth flow of resin inside the metal mold while securing a necessary length of the independent zone 126e, whereby dimensional errors, contour errors, internal distortion, defects and the like can be reduced. Moreover, the stress applied to and around the center of the outer edge rib 127 where the pressing force from the chain is largest can be dispersed to the directions of both ends via the connecting ribs 128e.

Since the lateral rib 125e and two connecting ribs 128e are connected at their intersections, the rigidity of the body part 120e against flexure and torsion can be enhanced.

While specific examples of the chain guide according to the present invention have been described in the embodiments above, the chain guide according to the present invention is not limited to these examples, and the shapes, positions, sizes, and positional relationships with each other of various constituent parts may be changed in various manners.

For example, while one form of use as a fixed guide has been shown in each embodiment, the chain guide may be used as a pivot guide, with one of the two support portions being a pressed part pressed by the tensioner.

While the chain guide has support portions at two locations in each embodiment, it may have three or more support portions. In this case, the lateral rib may be provided to at least one point between any two support portions, for example, between two adjacent support portions most spaced apart in the chain running direction, to be able to reduce stresses.

The protruding amount of the reinforcing rib from the support wall to one side, width, cross-sectional shape and the like may be determined as required. While those shown in the embodiments have a left-right symmetry about a center, the chain guide may have different shapes on left and right sides, not to mention other forms than those shown in the embodiments described above.

The protruding amount of the outer edge ribs along the upper and lower edges of the support wall from the support wall to one side, width, cross-sectional shape and the like can be determined freely. The outer edge ribs may be omitted.

While the chain guide is provided inside an engine that has a timing system in the embodiments described above, the chain guide can be applied to various other equipment.

The invention may not necessarily be applied to a chain transmission mechanism but also used for similar transmission mechanisms that use belts, ropes and the like, and can be applied in a variety of industrial fields.

What is claimed is:

1. A chain guide, comprising a guide surface that slidably guides a running chain and a body part that supports the guide surface along a chain running direction, the body part including a support wall of a predetermined height and a reinforcing rib protruding laterally from a portion other than upper and lower edges of the support wall,
   the reinforcing rib including a lateral rib,
   the reinforcing rib being integral with the body part,
   the body part including at least two support portions at two locations respectively, which are spaced away from each other in a longitudinal direction,
   the lateral rib having an independent zone where the lateral rib is not connected to other parts of the reinforcing rib over a length of 20% or more of a distance (L) between the support portions at the two locations, and
   the independent zone being provided on a side further away from the guide surface than a midpoint of the height of the support wall below the guide surface.

2. The chain guide according to claim 1, wherein the reinforcing rib is composed only of the lateral rib.

3. The chain guide according to claim 1, wherein
   the body part includes a laterally protruding outer edge rib along upper and lower edges of the support wall, and
   the reinforcing rib includes a connecting rib that extends from the lateral rib to the outer edge rib.

4. The chain guide according to claim 1, wherein
   at least one of the support portions at the two locations is formed by a mounting boss protruding laterally from the support wall, and
   the lateral rib is connected to the mounting boss.

5. The chain guide according to claim 1, wherein the reinforcing rib is composed only of the independent zone of the lateral rib.

6. The chain guide according to claim 1, wherein the independent zone is provided over a length of 50% or more of the distance L between the support portions at the two locations.

* * * * *